United States Patent
Sonzini et al.

(10) Patent No.: US 11,280,132 B2
(45) Date of Patent: Mar. 22, 2022

(54) TUBULAR ELECTROMECHANICAL ACTUATOR AND HOME AUTOMATION INSTALLATION COMPRISING SUCH AN ACTUATOR

(71) Applicant: SOMFY ACTIVITES SA, Cluses (FR)

(72) Inventors: Marc Sonzini, Allinges (FR); Florian Doche, Annecy (FR)

(73) Assignee: SOMFY ACTIVITES SA, Cluses (FR)

( * ) Notice: Subject to any disclaimer, the term of this patent is extended or adjusted under 35 U.S.C. 154(b) by 0 days.

(21) Appl. No.: 16/754,483

(22) PCT Filed: Oct. 9, 2018

(86) PCT No.: PCT/EP2018/077466
§ 371 (c)(1),
(2) Date: Apr. 8, 2020

(87) PCT Pub. No.: WO2019/072841
PCT Pub. Date: Apr. 18, 2019

(65) Prior Publication Data
US 2020/0340300 A1 Oct. 29, 2020

(30) Foreign Application Priority Data
Oct. 10, 2017 (FR) ...................... 1759471

(51) Int. Cl.
*E06B 9/72* (2006.01)
*E06B 9/50* (2006.01)
(Continued)

(52) U.S. Cl.
CPC ................ *E06B 9/72* (2013.01); *E06B 9/50* (2013.01); *E06B 9/171* (2013.01);
(Continued)

(58) Field of Classification Search
CPC ...... E06B 9/72; E06B 9/50; E06B 2009/6845; E06B 2009/725; E06B 9/171;
(Continued)

(56) References Cited

U.S. PATENT DOCUMENTS 4,079,597 A * 3/1978 Lindner ................... E06B 9/72
  192/142 R
4,146,288 A * 3/1979 Ramsay ............... H01R 13/625
  285/2

(Continued)

FOREIGN PATENT DOCUMENTS

DE  20 2007 013331   2/2009
EP  2 922 183        9/2015
FR  2 983 368        5/2013

OTHER PUBLICATIONS

International Search Report, PCT/EP2018/077466, dated Jan. 30, 2019.
French Search Report, FR 1759471, dated Jun. 19, 2018.

*Primary Examiner* — Johnnie A. Shablack
(74) *Attorney, Agent, or Firm* — Nixon & Vanderhye (57) ABSTRACT

A tubular electromechanical actuator includes an electric motor, reduction gear, output shaft and casing. The casing is hollow and houses at least the electric motor and the reduction gear. The casing includes a first end and a second end. The actuator also includes a retaining element assembled at the first end of the casing, so as to close off the first end of the casing. The retaining element includes at least a first stop configured to cooperate with the reduction gear, in an assembled configuration of the actuator, and a second stop configured to cooperate with the casing, at the first end of the casing, in the assembled configuration of the actuator. Furthermore, the retaining element includes at least one accommodation configured to cooperate with at least one rib of the reduction gear, so as to participate in the sealing between the retaining element and the reduction gear.

22 Claims, 8 Drawing Sheets

(51) Int. Cl.
 *E06B 9/171* (2006.01)
 *E06B 9/68* (2006.01)
 *H02K 7/116* (2006.01)

(52) U.S. Cl.
 CPC ............... *E06B 2009/6845* (2013.01); *E06B 2009/6872* (2013.01); *E06B 2009/725* (2013.01); *H02K 7/116* (2013.01); *H02K 2207/03* (2013.01)

(58) Field of Classification Search
 CPC .......... E06B 2009/6872; E06B 9/80; E06B 2009/905; H02K 7/116; H02K 2207/03; H02K 11/33; B21F 11/005; B21F 35/00; B21F 3/02; F16F 1/04; G01B 11/08; G01B 11/24; H01R 13/625
 See application file for complete search history.

(56) References Cited

U.S. PATENT DOCUMENTS

| | | | | |
|---|---|---|---|---|
| 6,162,082 | A * | 12/2000 | Karsten | H01R 13/523 439/318 |
| 9,334,688 | B2 * | 5/2016 | Colson | E06B 9/322 |
| 2009/0090805 | A1 * | 4/2009 | Hwaung | H02P 6/24 242/390.1 |
| 2010/0175838 | A1 * | 7/2010 | Faller | E06B 9/72 160/310 |
| 2010/0200176 | A1 * | 8/2010 | Magli | E06B 9/72 160/300 |
| 2010/0282890 | A1 * | 11/2010 | Ducornetz | E06B 9/174 242/404 |
| 2012/0216966 | A1 * | 8/2012 | Krab | E06B 9/322 160/168.1 P |
| 2014/0224437 | A1 * | 8/2014 | Colson | E06B 9/78 160/291 |
| 2016/0017656 | A1 * | 1/2016 | Adreon | E06B 9/68 160/7 |
| 2016/0380509 | A1 * | 12/2016 | Crites | H02K 5/225 310/68 B |
| 2017/0006740 | A1 * | 1/2017 | Holt | E06B 9/72 |
| 2017/0241201 | A1 * | 8/2017 | Buccola, Jr. | E06B 9/34 |
| 2017/0321480 | A1 * | 11/2017 | Li | H02K 7/116 |
| 2018/0106104 | A1 * | 4/2018 | Carvalheiro | E06B 9/72 |
| 2018/0259033 | A1 * | 9/2018 | Basutto | E06B 9/582 |
| 2018/0291682 | A1 * | 10/2018 | Walter-Seifart | E06B 9/40 |
| 2019/0085632 | A1 * | 3/2019 | Smith | E06B 9/88 |
| 2019/0100961 | A1 * | 4/2019 | Kutell | E06B 9/50 |
| 2019/0157936 | A1 * | 5/2019 | Seshita | B60J 11/04 |
| 2019/0257147 | A1 * | 8/2019 | Lei | E06B 9/72 |
| 2020/0099271 | A1 * | 3/2020 | Lemaitre | H02K 7/06 |

* cited by examiner

TUBULAR ELECTROMECHANICAL ACTUATOR AND HOME AUTOMATION INSTALLATION COMPRISING SUCH AN ACTUATOR

BACKGROUND OF THE INVENTION

Field of the Invention

The present invention relates to a tubular electromechanical actuator and a home automation installation for closing or sun protection comprising such an actuator.

In general, the present invention relates to the field of concealing devices comprising a motorized driving device setting a screen in motion, between at least one first position and at least one second position.

Description of the Related Art

A motorized driving device comprises an electromechanical actuator for a movable element for closing, concealing or sun protection such as a shutter, door, gate, blind or any other equivalent material, hereinafter referred to as a screen.

Document FR 2,983,368 A1 is already known, which describes a tubular electromechanical actuator for a closure or sun protection home automation installation. The electromechanical actuator comprises an electric motor, a reduction gear, an output shaft and a casing. The casing is hollow and configured to house the electric motor and the reduction gear. The casing comprises a first end and a second end. The second end is opposite the first end. The output shaft protrudes past the casing at the first end of the casing, in an assembled configuration of the electromechanical actuator.

Furthermore, the assembly of such an electromechanical actuator provides rotational blocking of the reduction gear relative to the casing, using notches arranged at one end of the reduction gear and deformed areas of the casing.

Furthermore, such an electromechanical actuator requires guaranteeing the sealing at the first end of the casing and, more specifically, between the casing and the reduction gear.

One known solution for guaranteeing the sealing at the first end of the casing is to position a seal on a closure element of the reduction gear, at the end of the reduction gear closest to the first end of the casing. This seal is assembled on the closure element of the reduction gear by overmolding.

However, this electromechanical actuator has the drawback of causing the seal to rub against an inner surface of the casing, during an operation to introduce the reduction gear inside the casing by driving, from the second end of the casing toward the first end of the casing.

As a result, during the operation to introduce the reduction gear inside the casing, the seal is damaged, in particular due to rubbing of the seal against the inner surface of the casing and metallic residues present on the inner surface of the casing.

The damage to the seal can cause a sealing flaw of the electromechanical actuator at the first end of the casing and therefore an electrical insulating flaw, following the installation of the electromechanical actuator in the home automation installation.

In order to limit the damage to the seal, during the operation to introduce the reduction gear inside the casing, the inner surface of the casing can be covered with a film of oil by spraying inside the casing.

Nevertheless, this operation to spray oil inside the casing has the drawback of forming an oily clump comprising metallic residues at the first end of the casing, following the operation to introduce the reduction gear inside the casing.

Furthermore, the operation for overmolding of the seal around the closure element of the reduction gear causes complexity in producing the electromechanical actuator.

As a result, the cost of obtaining the electromechanical actuator is high.

SUMMARY OF THE INVENTION

The present invention aims to resolve the aforementioned drawbacks and to propose a tubular electromechanical actuator, as well as a home automation installation for closing or sun protection comprising such actuator, making it possible to guarantee the sealing reliably at a first end of a casing configured for the passage of an output shaft and, more specifically, between the casing and a reduction gear, while minimizing the costs of obtaining the electromechanical actuator.

To that end, according to a first aspect, the present invention relates to a tubular electromechanical actuator for a closure or sun protection home automation installation, the electromechanical actuator comprising at least:
   an electric motor,
   a reduction gear,
   an output shaft, and
   a casing, the casing being hollow and configured to house at least the electric motor and the reduction gear, the casing comprising a first end and a second end, the second end being opposite the first end.

According to the invention, the electromechanical actuator also comprises a retaining element, the retaining element being assembled at the first end of the casing, so as to close off the first end of the casing. The retaining element comprises at least a first stop configured to cooperate with the reduction gear, in an assembled configuration of the electromechanical actuator, and a second stop configured to cooperate with the casing, at the first end of the casing, in the assembled configuration of the electromechanical actuator. Furthermore, the retaining element comprises at least one accommodation configured to cooperate with at least one rib of the reduction gear, so as to participate in the sealing between the retaining element and the reduction gear.

Thus, the sealing of the electromechanical actuator, at the first end of the casing, is carried out, on the one hand, by the partial fitting of the retaining element inside the casing, so as to close off the first end of the casing and, on the other hand, by the formation of a baffle between the retaining element and the reduction gear, using the accommodation of the retaining element and the rib of the reduction gear.

In this way, the assembly of the retaining element with the casing and the reduction gear, at the first end of the casing, makes it possible to guarantee the sealing of the electromechanical actuator reliably, while minimizing the costs of obtaining the electromechanical actuator.

As a result, such an assembly of the electromechanical actuator, at the first end of the casing, makes it possible to avoid a sealing flaw of the electromechanical actuator and therefore an electrical insulation flaw, following the installation of the electromechanical actuator in the home automation installation.

Furthermore, such a construction of the electromechanical actuator, at the first end of the casing, makes it possible to do away with a seal and risks of deterioration thereof, during the assembly of the electromechanical actuator, and, more specifically, during the introduction of the reduction gear inside the casing, as well as an additional operation to spray a film of oil on an inner surface of the casing.

According to one advantageous feature of the invention, the reduction gear comprises an endpiece configured to cooperate with the retaining element, at the first end of the casing, in the assembled configuration of the electromechanical actuator.

According to another advantageous feature of the invention, the endpiece comprises notches and tongues, positioned alternating around an axis of rotation of the electromechanical actuator, configured to cooperate, respectively, with tongues and notches of the retaining element.

According to another advantageous feature of the invention, the retaining element comprises indentations configured to cooperate with first recesses of the casing, the first recesses being arranged at the first end of the casing.

According to another advantageous feature of the invention, the retaining element comprises a passage opening for the output shaft.

According to another advantageous feature of the invention, the retaining element comprises fastening elements configured to cooperate with fastening elements of the casing.

According to another advantageous feature of the invention, the fastening elements of the retaining element and the casing are fastening elements by resilient snapping.

According to another advantageous feature of the invention, the output shaft is configured to protrude past the casing at the first end of the casing, in the assembled configuration of the electromechanical actuator.

According to another advantageous feature of the invention, the retaining element is configured to be inserted inside the casing, until the bearing of the second stop of the retaining element with the casing, with a tight fit, so as to participate in the sealing between the retaining element and the casing.

According to a second aspect, the invention relates to a home automation installation for closing or sun protection that comprises a screen able to be wound on a winding tube rotated by a tubular electromechanical actuator according to the invention.

This home automation installation has features and advantages similar to those previously described relative to the tubular electromechanical actuator described above.

BRIEF DESCRIPTION OF THE DRAWINGS

Other particularities and advantages of the invention will also appear in the description below, done in reference to the appended drawings, provided as non-limiting examples.

DESCRIPTION OF THE PREFERRED EMBODIMENTS

Figure 1:
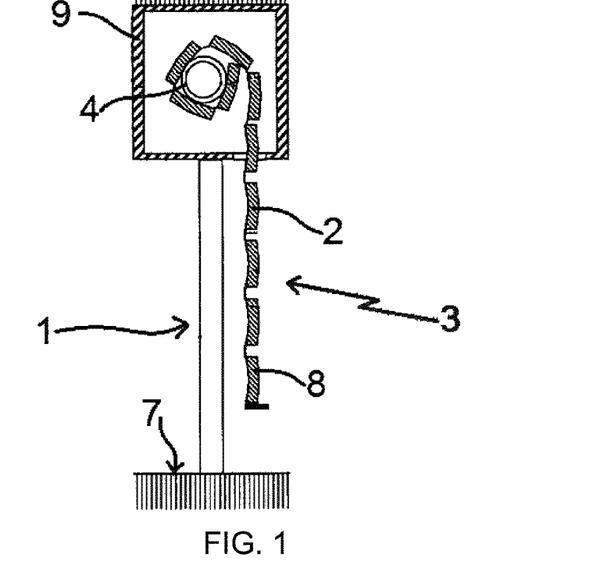
FIG. 1 is a cross-sectional schematic view of a home automation installation according to one embodiment of the invention.
Figure 2:
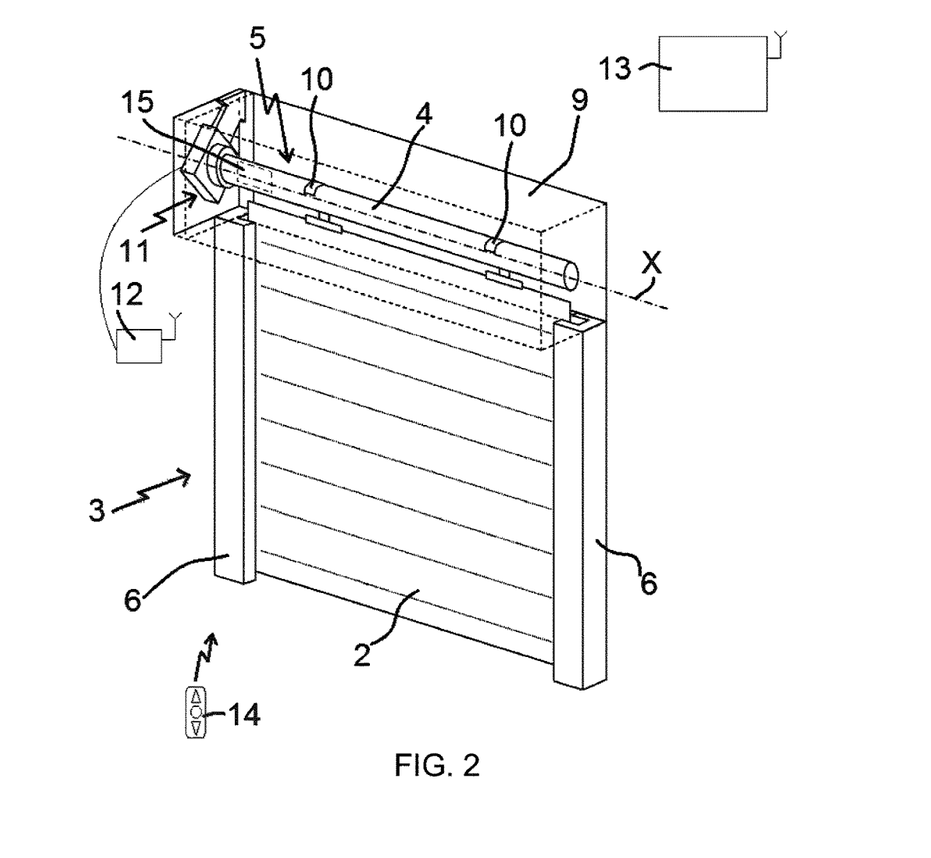
FIG. 2 is a perspective schematic view of the home automation installation illustrated in FIG. 1.

In reference to FIGS. 1 and 2, we first describe a home automation installation according to the invention and installed in a building comprising an opening 1, window or door, equipped with a screen 2 belonging to a concealing device 3, in particular a motorized rolling shutter.

The concealing device 3 can be a rolling shutter, a canvas blind or a blind with adjustable slats, or a rolling gate. The present invention applies to all types of concealing devices.

A rolling shutter according to one embodiment of the invention is described in reference to FIGS. 1 and 2.

The screen 2 of the concealing device 3 is wound on a winding tube 4 driven by a motorized driving device 5 and movable between a wound position, in particular an upper position, and an unwound position, in particular a lower position.

The moving screen 2 of the concealing device 3 is a closure, concealing and/or sun protection screen, winding on the winding tube 4, the inner diameter of which is generally greater than the outer diameter of an electromechanical actuator 11, such that the electromechanical actuator 11 can be inserted into the winding tube 4, during the assembly of the concealing device 3.

The motorized driving device 5 comprises the electromechanical actuator 11, of the tubular type, making it possible to set the winding tube 4 in rotation, so as to unwind or wind the screen 2 of the concealing device 3.

The concealing device 3 comprises the winding tube 4 for winding the screen 2. In the mounted state, the electromechanical actuator 11 is inserted into the winding tube 4.

In a known manner, the rolling shutter, which forms the concealing device 3, comprises an apron comprising horizontal slats articulated on one another, forming the screen 2 of the rolling shutter 3, and guided by two lateral guideways 6. These slats are joined when the apron 2 of the rolling shutter 3 reaches its unwound lower position.

In the case of a rolling shutter, the wound upper position corresponds to the bearing of a final end slat 8, which is for example L-shaped, of the apron 2 of the rolling shutter 3 against an edge of a box 9 of the rolling shutter 3, and the unwound lower position corresponds to the bearing of the final end slat 8 of the apron 2 of the rolling shutter 3 against a threshold 7 of the opening 1.

The first slat of the apron 2 of the rolling shutter 3, opposite the final end slat 8, is connected to the winding tube 4 using at least one articulation 10, in particular a fastener in strip form.

The winding tube 4 is positioned inside the box 9 of the rolling shutter 3. The apron 2 of the rolling shutter 3 winds and unwinds around the winding tube 4 and is housed at least partially inside the box 9.

In general, the box 9 is positioned above the opening 1, or in the upper part of the opening 1.

The motorized driving device 5 is controlled by a control unit. The control unit may, for example, be a local control unit 12, where the local control unit 12 can be connected through a wired or wireless connection with a central control unit 13. The central control unit 13 drives the local control unit 12, as well as other similar local control units distributed throughout the building.

The central control unit 13 can be in communication with a weather station located outside the building, in particular including one or more sensors that can be configured, for example, to determine a temperature, a brightness, or a wind speed.

A remote control 14, which can be a type of local control unit, and provided with a control keypad, which comprises selection and display elements, further allows a user to intervene on the electromechanical actuator 11 and/or the central control unit 13.

The motorized driving device 5 is, preferably, configured to carry out the unwinding or winding commands of the screen 2 of the concealing device 3, which may, in particular, be acquired by the remote control 14.

The electromechanical actuator 11 belonging to the home automation installation of FIGS. 1 and 2 is now described in more detail and in reference to FIGS. 3 to 13.

The electromechanical actuator 11 comprises an electric motor 16, a reduction gear 19 and an output shaft 20.

Furthermore, the electromechanical actuator 11 may comprise an electronic control unit 15.

Figure 3:
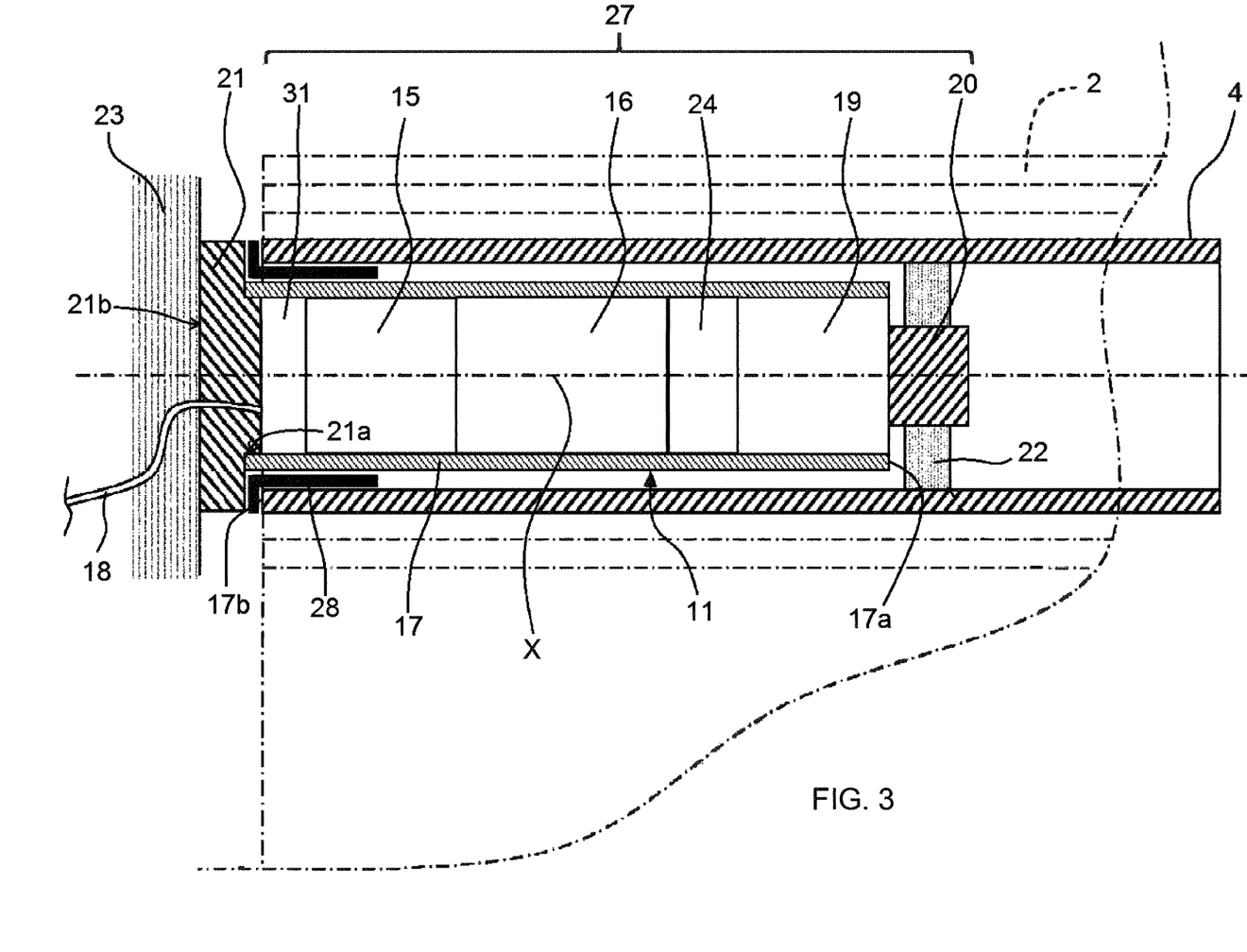
FIG. 3 is a partial and axial sectional schematic view of the home automation installation illustrated in FIGS. 1 and 2, showing a tubular electrochemical actuator of the installation.
Figure 13:
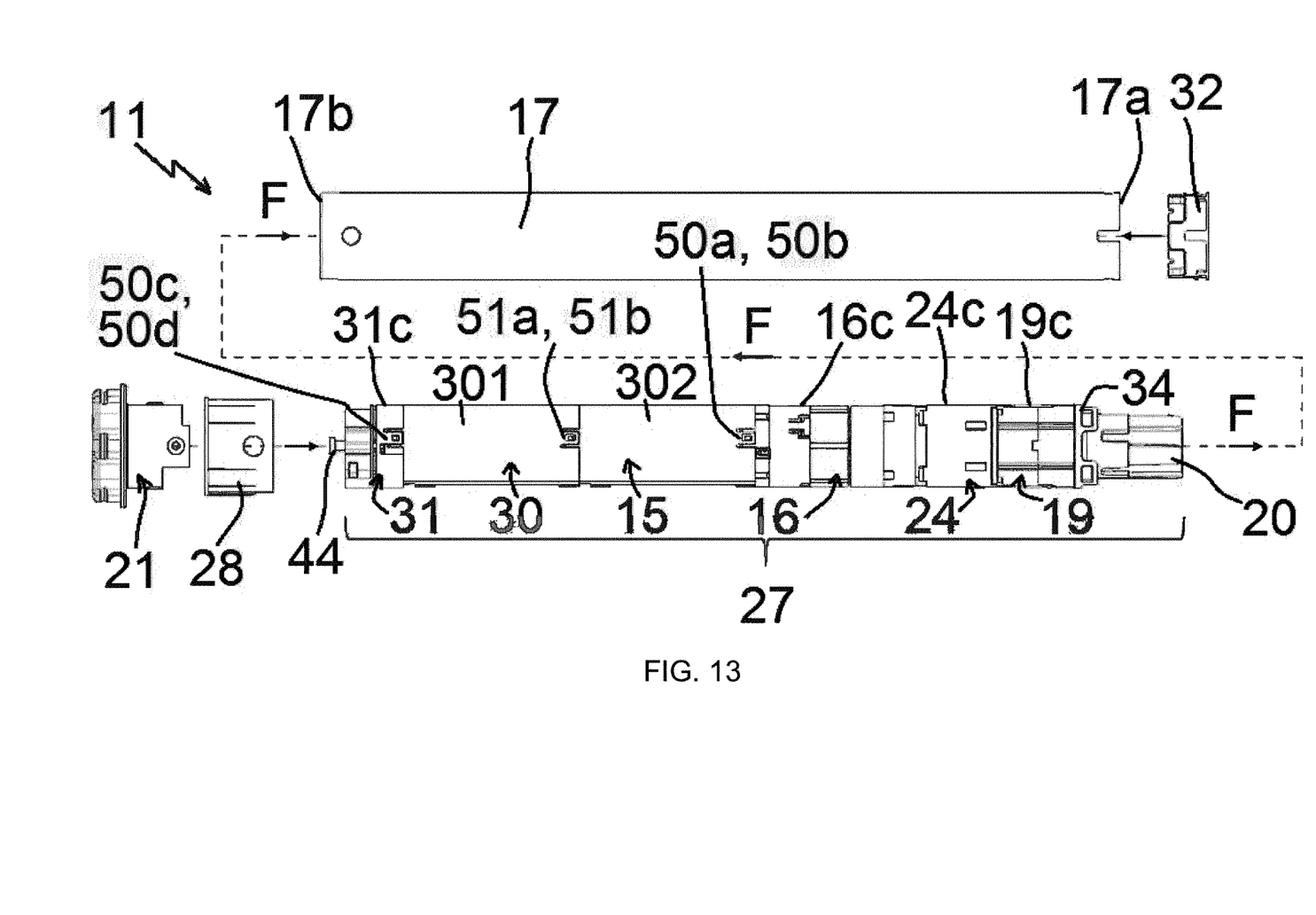
FIG. 13 is a schematic view of the electromechanical actuator illustrated in FIGS. 4 and 5, representative of an assembly method of this actuator.

Here, the electric motor 16, the reduction gear 19, the output shaft 20 and, optionally, the electronic control unit 15 form an assembly 27, as illustrated in FIGS. 3 and 13.

Thus, the assembly 27 is formed by members of the electromechanical actuator 11, of which the electric motor 16, the reduction gear 19 and the output shaft 20 and, optionally, the electronic control unit 15 are an integral part.

The electric motor 16 comprises a rotor and a stator, not shown, which are positioned coaxially around a rotation axis X, which is also the rotation axis of the winding tube 4 in the assembled configuration of the motorized driving device 5.

Here, the reduction gear 19 is of the type with gear pairs.

In practice, the electric motor 16 comprises an output shaft, not shown, configured to cooperate with an input shaft, not shown, of the reduction gear 19, in an assembled configuration of the electromechanical actuator 11.

Control means for controlling the electromechanical actuator 11, making it possible to move the screen 2 of the concealing device 3, comprise at least the electronic control unit 15. This electronic control unit 15 is able to operate the electric motor 16 of the electromechanical actuator 11 and, in particular, to allow the supply of electricity for the electric motor 16.

Thus, the electronic control unit 15, in particular, controls the electric motor 16, so as to open or close the screen 2, as previously described.

The electronic control unit 15 also comprises an order receiving module, in particular for wireless orders sent by an order transmitter, such as the remote control 14 designed to control the electromechanical actuator 11 or one of the local 12 or central 13 control units.

The order receiving module can also allow the reception of orders sent by wired means.

The control means of the electromechanical actuator 11 comprise hardware and/or software means.

As a non-limiting example, the hardware means may comprise at least one microcontroller.

The electromechanical actuator 11 also comprises a casing 17, which is, in particular, tubular.

The casing 17 of the electromechanical actuator 11 is, preferably, in cylindrical shape and, more specifically, has a circular section.

In one embodiment, the casing 17 is made from an electrically conductive material, in particular metallic.

The material of the casing of the electromechanical actuator is not limiting and may be different. It can, in particular, be a plastic.

The casing 17 is hollow and configured to house the electric motor 16, the reduction gear 19 and, optionally, the electronic control unit 15. Furthermore, the casing 17 can, optionally, be configured to house part of the output shaft 20.

The casing 17 comprises a first end 17a and a second end 17b. The second end 17b is opposite the first end 17a.

The output shaft 20 of the electromechanical actuator 11 is configured to protrude past the casing 17 at the first end 17a of the casing 17, in the assembled configuration of the electromechanical actuator 11.

Thus, the output shaft 20 of the electromechanical actuator 11 is positioned inside the winding tube 4 and at least partially outside the casing 17 of the electromechanical actuator 11.

Advantageously, the output shaft 20 of the electromechanical actuator 11 is coupled, by a connecting element 22, to the winding tube 4, in particular using a wheel-shaped connecting element.

The electromechanical actuator 11 is supplied with electricity by an electricity grid of the sector, or using a battery, which can, for example, be recharged by a photovoltaic panel. The electromechanical actuator 11 makes it possible to move the screen 2 of the concealing device 3.

Here, the electromechanical actuator 11 comprises an electrical power cable 18 allowing it to be supplied with electricity from the electricity grid of the sector.

Advantageously, the electromechanical actuator 11 also comprises a brake 24.

Here, the brake 24 of the electromechanical actuator 11 is an integral part of the assembly 27.

As a non-limiting example, the brake 24 may be a spring-loaded brake, a cam brake or an electromagnetic brake.

Advantageously, the electromechanical actuator 11 may also comprise an end-of-travel and/or obstacle detection device, which may be mechanical or electronic.

The electromechanical actuator 11 also comprises a closure element 21 for the second end 17b of the casing 17.

The closure element 21 is configured to protrude past the casing 17 at the second end 17b of the casing 17, in the assembled configuration of the electromechanical actuator 11.

In practice, the closure element 21 is positioned at one end of the electromechanical actuator 11 opposite that at which the output shaft 20 protrudes from the casing 17.

Here, the casing 17 of the electromechanical actuator 11 is fastened to a support 23, in particular a flange, of the box 9 of the concealing device 3 using the closure element 21 forming a torque pin, in particular a closure and torque-reacting head. In such a case where the closure element 21 forms a torque pin, the closure element 21 is also called a fixed point of the electromechanical actuator 11.

Advantageously, the closure element 21 is made from plastic and, more specifically, by molding.

In the exemplary embodiment illustrated in FIGS. 3 to 6 and 12 to 13, the closure element 21 is made in a single piece, in particular of the monobloc type.

Here, the closure element 21 is a revolving part.

The closure element 21 comprises a first part 21a configured to cooperate with the casing 17 of the electromechanical actuator 11 and a second part 21b configured to cooperate with the support 23.

At least the first part 21a of the closure element 21 is generally in cylindrical shape and is arranged inside the casing 17 of the electromechanical actuator 11, in the assembled configuration of the electromechanical actuator 11.

Advantageously, the closure element 21 comprises a stop 25 configured to cooperate with the casing 17, at the second end 17b of the casing 17, in the assembled configuration of the electromechanical actuator 11, in particular via a crown 28.

Thus, the stop 25 of the closure element 21 makes it possible to limit the pushing in of the first part 21a of the closure element 21 in the casing 17.

Furthermore, the stop 25 of the closure element 21 delimits the first and second parts 21a, 21b of the closure element 21.

Thus, only the first part 21a of the closure element 21 is arranged inside the casing 17 of the electromechanical actuator 11, following the fitting of the closure element 21 inside the casing 17, up to the stop 25.

Here, the stop 25 of the closure element 21 is made in the form of a flange ring, in particular with a cylindrical and planar shape.

In a variant, not shown, the closure element 21 comprises at least two parts. The first part of the closure element 21 comprises the first part 21a of the closure element 21 configured to cooperate with the casing 17 of the electromechanical actuator 11. The second part of the closure element 21 comprises the second part 21b of the closure element 21 configured to cooperate with the support 23.

Advantageously, the electromechanical actuator 11 comprises the crown 28. The crown 28 is arranged around the casing 17 of the electrochemical actuator 11 and at the second end 17b of the casing 17.

Here, the winding tube 4 is rotated about the rotation axis X and the casing 17 of the electromechanical actuator 11 supported by two pivot links. The first pivot link is produced at a first end of the winding tube 4 using the crown 28. The crown 28 thus makes it possible to produce a bearing. The second pivot link, not shown, is produced at a second end of the winding tube 4.

The electromechanical actuator 11 also comprises an interface element 31, as illustrated in FIGS. 4 to 6, 12 and 13. The interface element 31 is arranged between the closure element 21 and, more specifically, the first part 21a of the closure element 21, and the electronic control unit 15, along the direction of the rotation axis X.

Here, the interface element 31 of the electromechanical actuator 11 is an integral part of the assembly 27.

Figure 4:
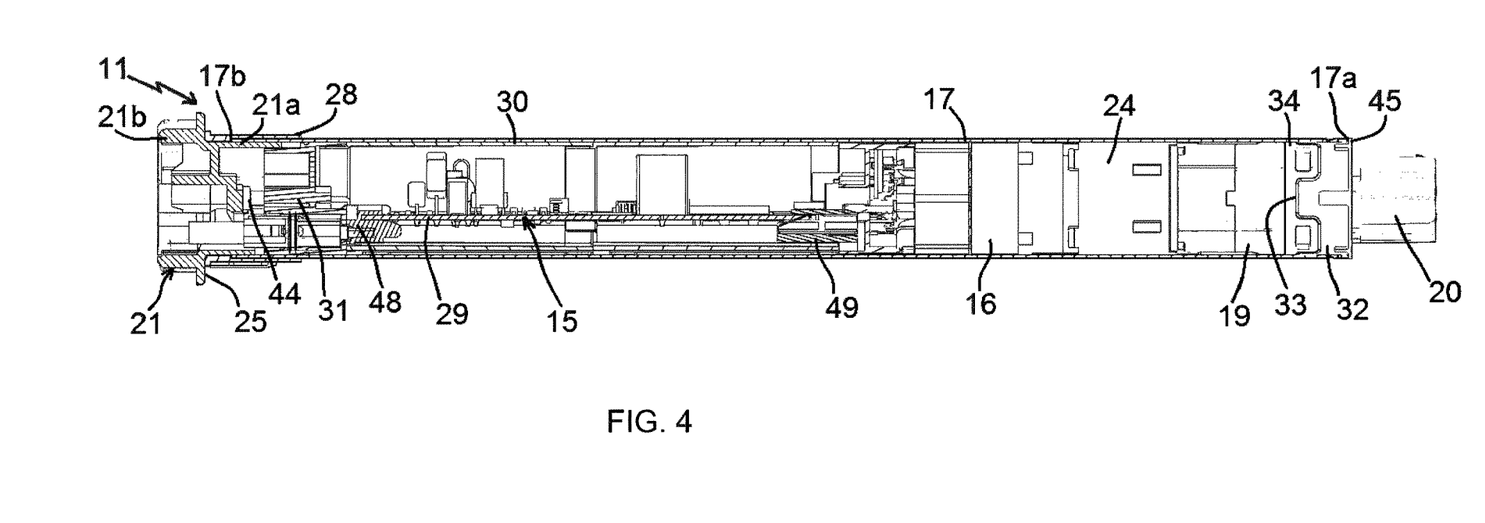
FIG. 4 is a sectional schematic view of the electromechanical actuator illustrated in FIG. 3, in an offset section plane relative to a longitudinal axis of the actuator.
Figure 5:
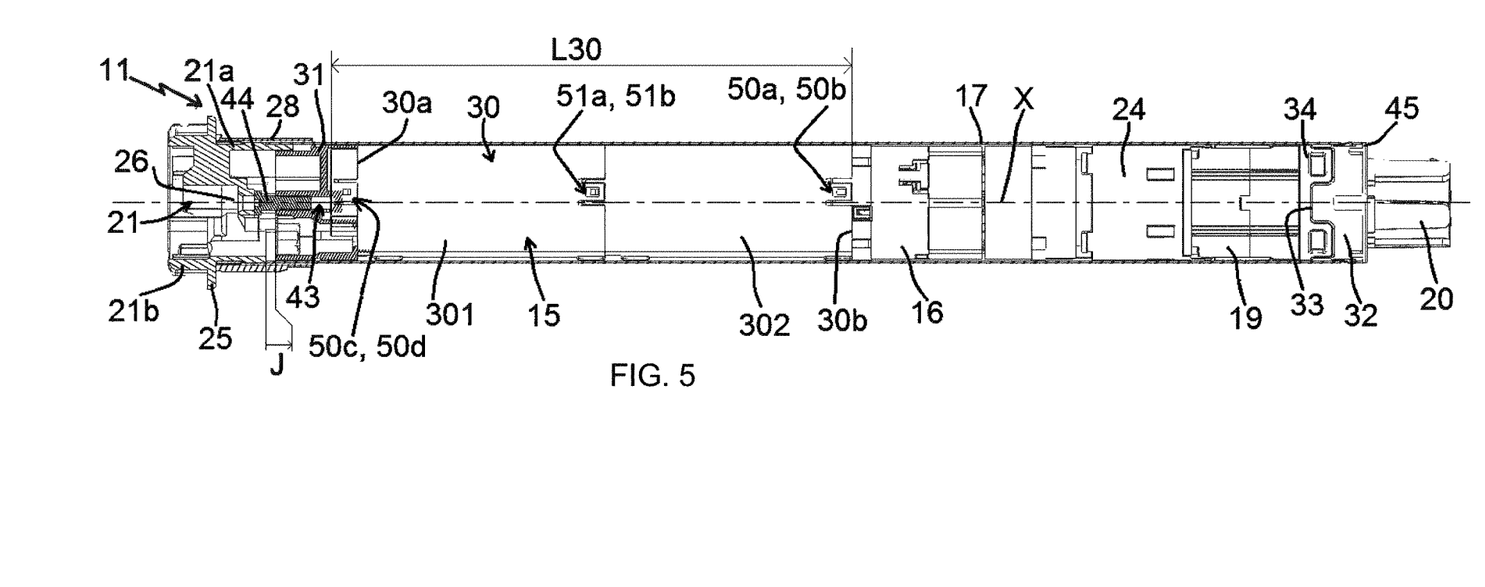
FIG. 5 is a partial sectional schematic view of the electromechanical actuator illustrated in FIG. 3, in a section plane passing through the longitudinal axis of the actuator.

Here, and as illustrated in FIGS. 4 and 5, the electronic control unit 15, the electric motor 16, the reduction gear 19, the interface element 31 and the brake 24 are positioned inside the casing 17 of the electromechanical actuator 11.

Preferably, the members 31, 15, 16, 19, 24, 20 of the assembly 27 are assembled to one another in a predetermined order. The predetermined assembly order of the members 31, 15, 16, 19, 24, 20 of the assembly 27 first comprises the assembly of the interface element 31 with the electronic control unit 15, then the assembly of the electronic control unit 15 with the electric motor 16, then the assembly of the electric motor 16 with the reduction gear 19 and the assembly of the reduction gear 19 with the output shaft 20.

In the exemplary embodiment illustrated in FIGS. 3 to 5 and 13, the brake 24 is positioned between the electric motor 16 and the reduction gear 19.

In a variant, not shown, the brake 24 is positioned between the reduction gear 19 and the output shaft 20.

Here, each member 31, 15, 16, 19, 24, 20 of the assembly 27 has an axis that is combined with the rotation axis X, in the assembled configuration of the electromechanical actuator 11. The axis of each of the members 15, 16, 19, 24, 20 of the assembly 27 is not shown in FIGS. 3 to 13, so as to simplify the reading thereof.

Advantageously, the electronic control unit 15 comprises a housing 30 and an electronic board 29. The electronic board 29 is positioned inside the housing 30, in an assembled configuration of the electronic control unit 15.

Thus, the housing 30 of the electronic control unit 15 makes it possible to protect the electronic board 29, during and after the assembly of the electromechanical actuator 11, as well as to ensure the rigidity of the assembly 27.

Furthermore, the housing 30 of the electronic control unit 15 makes it possible to electrically insulate the electronic board 29 relative to the casing 17.

Here and as illustrated in FIGS. 5 and 13, the housing 30 comprises a first section 301, made in the form of a first hollow tube, and a second section 302, made in the form of a second hollow tube.

The first and second sections 301, 302 are configured to house the electronic board 29, in the assembled configuration of the electronic control unit 15.

In a variant, not shown, the housing 30 comprises a single section.

The housing 30 of the electronic control unit 15 is, preferably, in cylindrical shape and, more specifically, has a circular section.

Preferably, the outer diameter of the housing 30 of the electronic control unit 15 is smaller than the inner diameter of the casing 17 of the electromechanical actuator 11, such that the housing 30 can be inserted into the casing 17 of the electromechanical actuator 11, during the assembly of the electromechanical actuator 11.

Here, the housing 30 of the electronic control unit 15 comprises a first end 30a configured to cooperate with the interface element 31 and a second end 30b configured to cooperate with the electric motor 16.

Furthermore, the electronic board 29 is configured to cooperate with an electrical connector 48 of the interface element 31, in the assembled configuration of the electromechanical actuator 11. Furthermore, the electronic board 29 is configured to cooperate with an electrical connector 49 of the electric motor 16, in the assembled configuration of the electromechanical actuator 11.

The various members of the electromechanical actuator 11 belonging to the home automation installation of FIGS. 1 and 2 are now described in reference to FIGS. 3 to 13.

Advantageously, the electric motor 16 has a body 16*c*, as illustrated in FIG. 13. Furthermore, the body 16*c* of the electric motor 16 is, preferably, in cylindrical shape and, more specifically, has a circular section.

Preferably, the outer diameter of the body 16*c* of the electric motor 16 is smaller than the inner diameter of the casing 17 of the electromechanical actuator 11, such that the body 16*c* of the electric motor 16 can be inserted into the casing 17 of the electromechanical actuator 11, during the assembly of the electromechanical actuator 11.

Advantageously, the reduction gear 19 has a body 19*c*, as illustrated in FIG. 13. Furthermore, the body 19*c* of the reduction gear 19 is, preferably, in cylindrical shape and, more specifically, has a circular section.

Preferably, the outer diameter of the body 19*c* of the reduction gear 19 is smaller than the inner diameter of the casing 17 of the electromechanical actuator 11, such that the body 19*c* of the reduction gear 19 can be inserted into the casing 17 of the electromechanical actuator 11, during the assembly of the electromechanical actuator 11.

Figure 6:
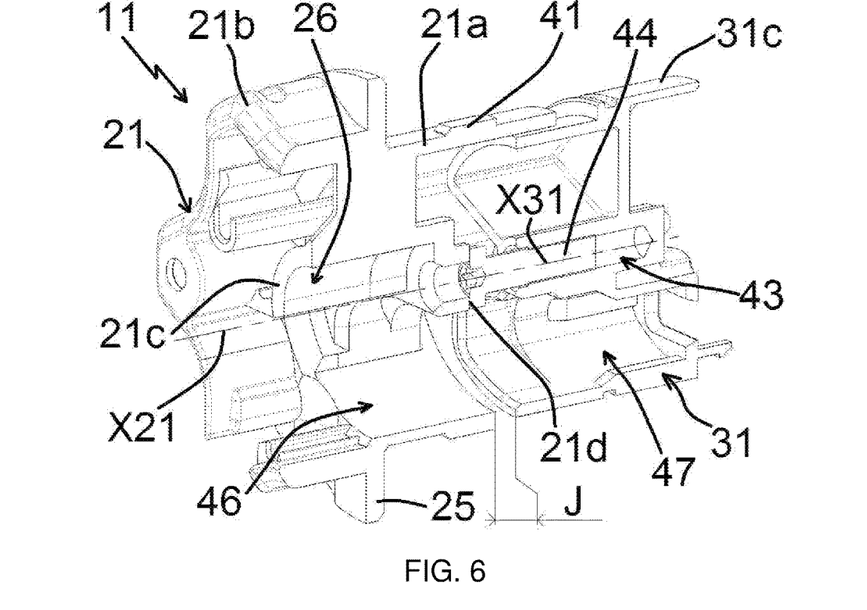
FIG. 6 is a sectional and perspective schematic view of part of the electromechanical actuator illustrated in FIGS. 4 and 5, showing a closure element, an interface element and an inhibiting element.

Advantageously, the interface element 31 has a body 31*c*, as illustrated in FIGS. 6 and 13. Furthermore, the body 31*c* of the interface element 31 is, preferably, in cylindrical shape and, more specifically, has a circular section.

Preferably, the outer diameter of the body 31*c* of the interface element 31 is smaller than the inner diameter of the casing 17 of the electromechanical actuator 11, such that the body 31*c* of the interface element 31 can be inserted into the casing 17 of the electromechanical actuator 11, during the assembly of the electromechanical actuator 11.

Advantageously, the brake 24 has a body 24*c*, as illustrated in FIG. 13. Furthermore, the body 24*c* of the brake 24 is, preferably, in cylindrical shape and, more specifically, has a circular section.

Preferably, the outer diameter of the body 24*c* of the brake 24 is smaller than the inner diameter of the casing 17 of the electromechanical actuator 11, such that the body 24*c* of the brake 24 can be inserted into the casing 17 of the electromechanical actuator 11, during the assembly of the electromechanical actuator 11.

Advantageously, the body 31*c* of the interface element 31, the first and second sections 301, 302 of the housing 30 of the electronic control unit 15, the body 16*c* of the electric motor 16, the body 19*c* of the reduction gear 19 and, optionally, the body 24*c* of the brake 24 are assembled to one another using fastening elements 50*a*, 50*b*, 50*c*, 50*d*, 51*a*, 51*b*, in particular by resilient snapping, so as to form the assembly 27.

Thus, the fastening elements 50*a*, 50*b*, 50*c*, 50*d*, 51*a*, 51*b* of the various members 31, 15, 16, 19, 24 of the assembly 27 make it possible to secure these members 31, 15, 16, 19, 24 to one another in rotation and in translation.

In this way, following the fastening of the members 31, 15, 16, 19, 24 of the assembly 27 relative to one another, the links between the members 31, 15, 16, 19, 24 of the assembly 27 have no axial travel, outside the assembly tolerances of the members 31, 15, 16, 19, 24 relative to one another.

Furthermore, the assembly of the various members 31, 15, 16, 19, 24 of the assembly 27 using fastening elements 50*a*, 50*b*, 50*c*, 50*d*, 51*a*, 51*b* makes it possible to introduce the assembly 27, in a single operation, into the casing 17, following a translational movement.

Here, the fastening elements 50*a*, 50*b*, 50*c*, 50*d*, 51*a*, 51*b* by resilient snapping are made using tongues and slugs.

Here, one of the members of the assembly 27 is assembled to another of the members of the assembly 27 using fastening elements 50*a*, 50*b*, 50*c*, 50*d*, 51*a*, 51*b* by resilient snapping, these snapping elements can be four in number and angularly offset by an angle of 90° about the axis of rotation X.

The number and the angular position of the fastening elements by resilient snapping between two of the members of the assembly are not limiting and can be different, in particular, these fastening elements can be three in number and angularly offset by an angle of 120° about the axis of rotation.

Preferably, the outer diameter, respectively, of the body 31*c* of the interface element 31, the housing 30 of the electronic control unit 15, the body 16*c* of the electric motor 16, the body 19*c* of the reduction gear 19 and the body 24*c* of the brake 24 have a same value.

We now describe, in more detail and in reference to FIGS. 7 to 11, the assembly of the part of the electromechanical actuator 11 on the side of the output shaft 20.

Figure 7:
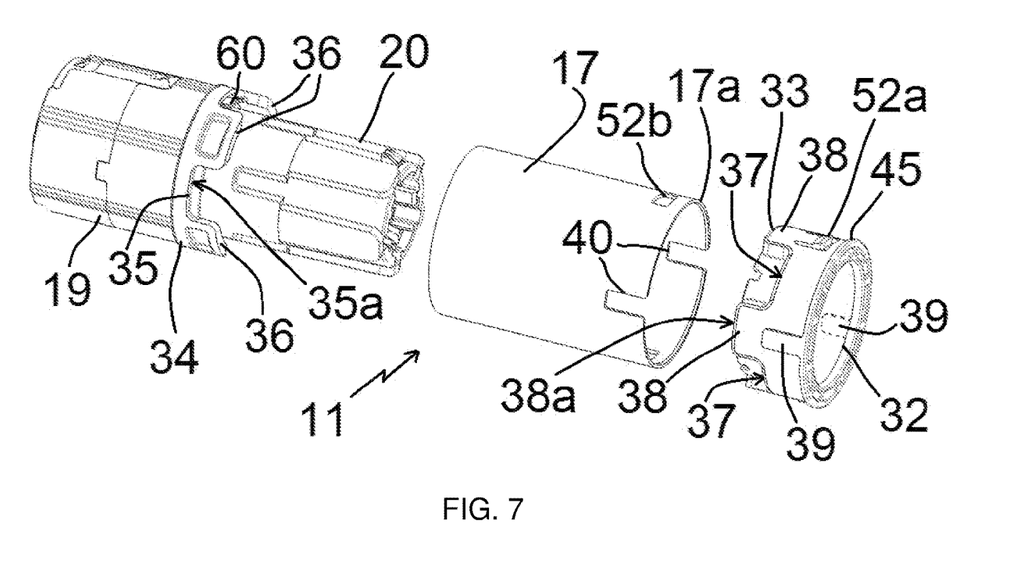
FIG. 7 is an exploded and perspective schematic view of part of the electromechanical actuator illustrated in FIGS. 4 and 5, showing part of a casing of the electrochemical actuator, a reduction gear, an output shaft, an endpiece and a retaining element.
Figure 8:
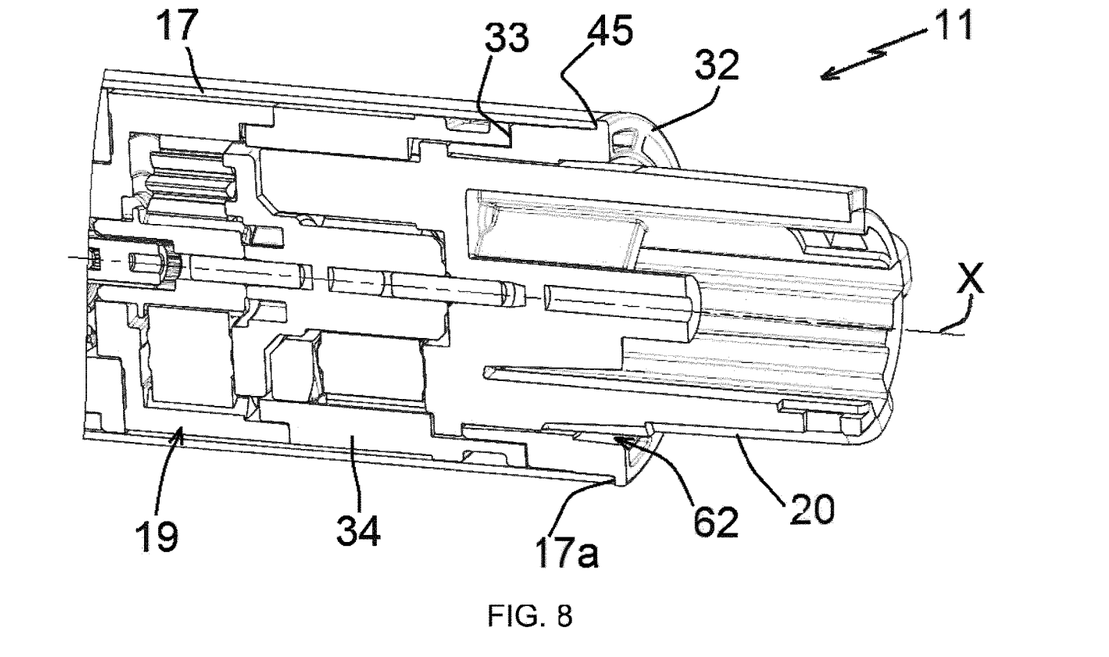
FIGS. 8 to 10 are sectional and perspective schematic views of part of the electromechanical actuator illustrated in FIGS. 4, 5 and 7, along different orientations of the section plane relative to a rotation axis of the electromechanical actuator, showing the assembly of the retaining element relative to the casing, the reduction gear and the output shaft.

Advantageously and as illustrated in FIGS. 4, 5, 7 to 11 and 13, the reduction gear 19 comprises an endpiece 34 configured to cooperate with a retaining element 32, at the first end 17*a* of the casing 17, in the assembled configuration of the electromechanical actuator 11. In FIG. 7, only part of the casing 17 is shown, near its end 17*a*.

Preferably, the endpiece 34 comprises notches 35 and tongues 36, positioned alternating around the axis of rotation X, configured to cooperate, respectively, with tongues 38 and notches 37 of the retaining element 32, as illustrated in FIG. 7.

Thus, the tongues 38 of the retaining element 32 are configured to engage in the notches 35 of the endpiece 34, in the assembled configuration of the electromechanical actuator 11. Furthermore, the tongues 36 of the endpiece 34 are configured to engage in the notches 37 of the retaining element 32, in the assembled configuration of the electromechanical actuator 11.

In such a case, a first stop 33 of the retaining element 32 configured to cooperate with the reduction gear 19, in the assembled configuration of the electromechanical actuator 11, is produced by an end wall 38*a* of each of the tongues 38, these end walls bearing against the bottom walls 35*a* of each of the notches 35 of the endpiece 34.

Here, the endpiece 34 comprises four notches 35 that are angularly offset by an angle of 90°, around the axis of rotation X, and four tongues 36 that are angularly offset by an angle of 90°, around the axis of rotation X. Furthermore, the retaining element 32 comprises four notches 37 that are angularly offset by an angle of 90°, around the axis of rotation X, and four tongues 38 that are angularly offset by an angle of 90°, around the axis of rotation X.

The number and the angular position of the notches and tongues of the endpiece and of the retaining element are not limiting and can be different, in particular, these notches and tongues can be three in number and angularly offset by an angle of 120° about the axis of rotation.

Here, the endpiece 34 of the reduction gear 19 is an additional part relative to the elements forming the body 19*c* of the reduction gear 19, so as to optimize the sizing of the gear pairs of the reduction gear 19 and to facilitate their assembly inside the body 19*c* of the reduction gear 19.

In a variant, not shown, the endpiece 34 of the reduction gear 19 is an integral part of an element of the body 19c of the reduction gear 19, so as to reduce the number of parts making up the reduction gear 19.

The electromechanical actuator 11 also comprises the retaining element 32. The retaining element 32 is assembled at the first end 17a of the casing 17, so as to close off the first end 17a of the casing 17.

The retaining element 32 comprises the first stop 33 configured to cooperate with the reduction gear 19, in the assembled configuration of the electromechanical actuator 11.

Thus, the first stop 33 of the retaining element 32 makes it possible to limit the pushing in of the reduction gear 19 inside the casing 17.

Here, the first stop 33 of the retaining element 32 makes it possible to block the translational movement of the assembly 27 inside the casing 17, during the assembly of the electromechanical actuator 11.

The retaining element 32 comprises a second stop 45 configured to cooperate with the casing 17, at the first end 17a of the casing 17, in the assembled configuration of the electromechanical actuator 11.

Thus, the second stop 45 of the retaining element 32 makes it possible to limit the pushing in of the retaining element 32 in the casing 17.

Here, the second stop 45 of the retaining element 32 is made in the form of a flange ring, in particular with a cylindrical and planar shape, perpendicular to the axis of rotation X, in the assembled configuration of the electromechanical actuator 11.

The retaining element 32 comprises an accommodation 61 configured to cooperate with a rib 60 of the reduction gear 19 and, more specifically, of the endpiece 34 of the reduction gear 19, so as to participate in the sealing between the retaining element 32 and the reduction gear 19. The accommodation 61 is not visible in the illustration of FIG. 7, but can be identified in FIGS. 9 to 11.

Thus, the sealing of the electromechanical actuator 11, at the first end 17a of the casing 17, is carried out, on the one hand, by the partial fitting of the retaining element 32 inside the casing 17, so as to close off the first end 17a of the casing 17 and, on the other hand, by the formation of a baffle between the retaining element 32 and the reduction gear 19, using the accommodation 61 of the retaining element 32 and the rib 60 of the reduction gear 19.

In this way, the assembly of the retaining element 32 with the casing 17 and the reduction gear 19, at the first end 17a of the casing 17, makes it possible to guarantee the sealing of the electromechanical actuator 11 reliably, while minimizing the costs of obtaining the electromechanical actuator 11.

As a result, such an assembly of the electromechanical actuator 11, at the first end 17a of the casing 17, makes it possible to avoid a sealing flaw of the electromechanical actuator 11 and therefore an electrical insulation flaw, following the installation of the electromechanical actuator 11 in the home automation installation.

The formation of a baffle between the retaining element 32 and the reduction gear 19, using the accommodation 61 of the retaining element 32 and the rib 60 of the reduction gear 19, makes it possible to prevent an infiltration of water flowing between the output shaft 20 and the retaining element 32, toward the inside of the electromechanical actuator 11 and, more specifically, between the retaining element 32, the reduction gear 19 and the casing 17.

Preferably, the baffle formed between the retaining element 32 and the reduction gear 19, using the accommodation 61 of the retaining element 32 and the rib 60 of the reduction gear 19, is done by the cooperation of at least one wall of the accommodation 61 of the retaining element 32 with at least one wall of the rib 60 of the reduction gear 19.

Advantageously, the number of walls configured to cooperate together between the accommodation 61 of the retaining element 32 and the rib 60 of the reduction gear 19 depends on an angular section of the retaining element 32 relative to the reduction gear 19 around the axis of rotation X, in the assembled configuration of the electromechanical actuator 11.

Figure 9:
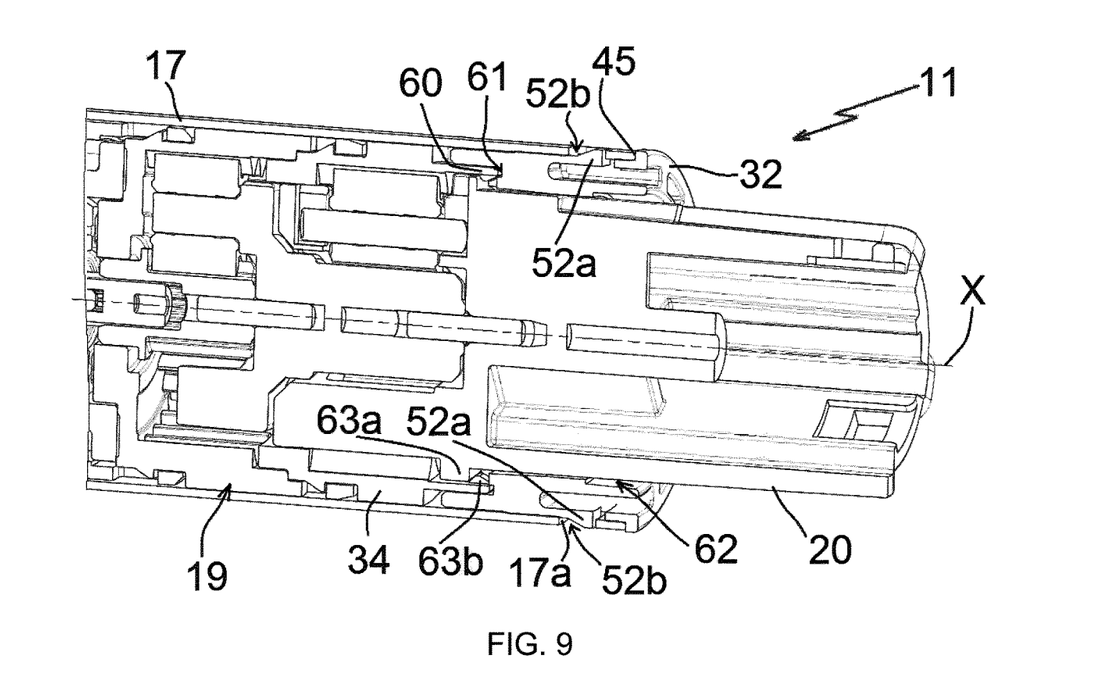

Here, the accommodation 61 of the retaining element 32 comprises a wall configured to cooperate with a wall of the rib 60 of the reduction gear 19, as illustrated in FIG. 9, that is to say along a first section plane of the electromechanical actuator 11 passing through the axis of rotation X. Furthermore, the accommodation 61 of the retaining element 32 comprises two walls configured respectively to cooperate with a wall of the rib 60 of the reduction gear 19, as illustrated in FIGS. 10 and 11, that is to say along a second section plane of the electromechanical actuator 11 passing through the axis of rotation X, such that the accommodation 61 of the retaining element 32 forms a groove.

Figure 10:
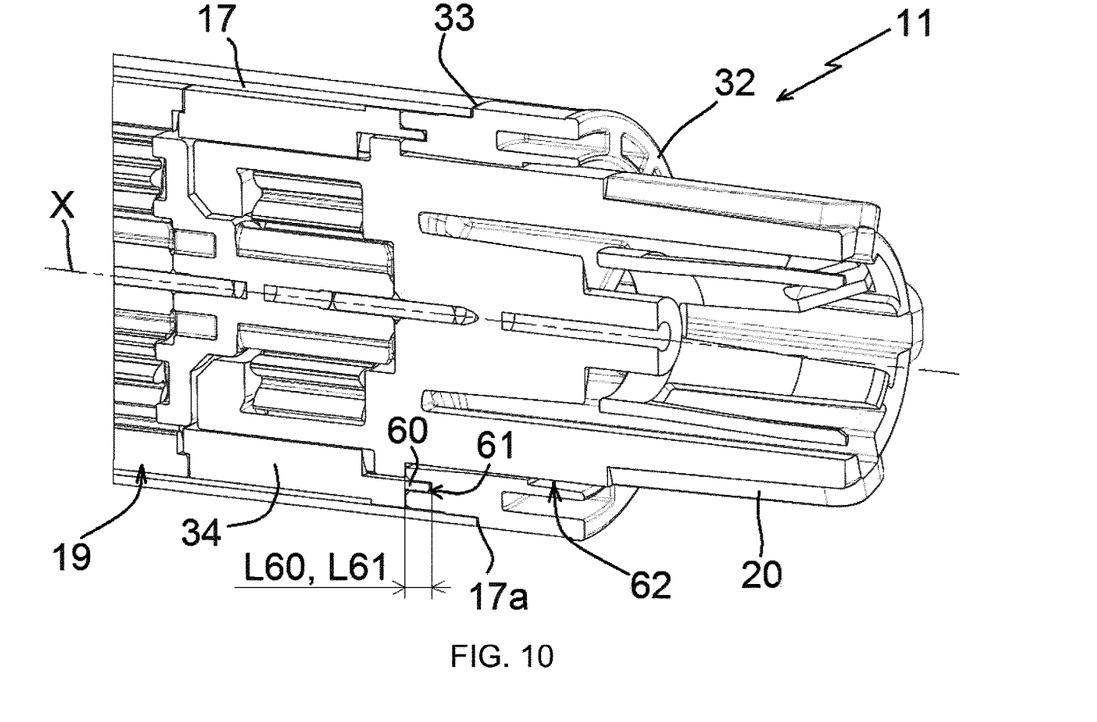

Advantageously, the length L61 of the accommodation 61 of the retaining element 32 and the length L60 of the rib 60 of the reduction gear 19 respectively extend parallel to the axis of rotation X of the electromechanical actuator 11, as illustrated in FIG. 10.

Figure 11:
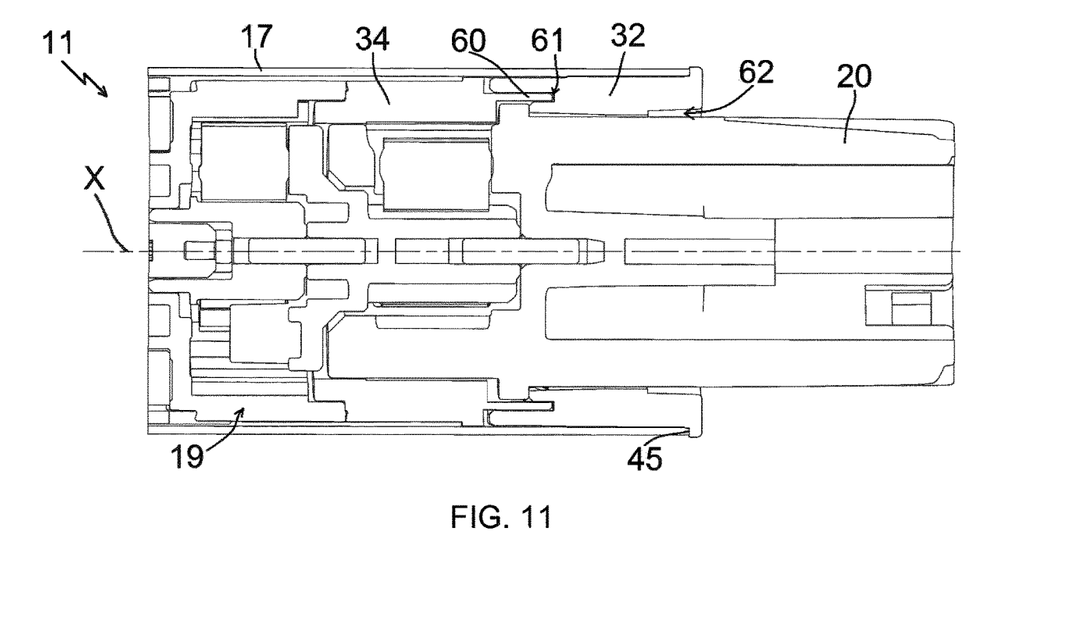
FIG. 11 is a sectional schematic view of part of the electromechanical actuator illustrated in FIGS. 4, 5 and 7, showing the assembly of the retaining element relative to the casing, the reduction gear and the output shaft.

Here and as illustrated in FIGS. 9 to 11, the retaining element 32 comprises a single accommodation 61. Furthermore, the reduction gear 19 comprises a single rib 60.

In a variant, not shown, the retaining element 32 comprises a plurality of accommodations 61. Furthermore, the reduction gear 19 can comprise a plurality of ribs 60. In such a case, the number of accommodations 61 of the retaining element 32 is, preferably, equal to the number of ribs 60 of the reduction gear 19.

Here, the accommodation 61 of the retaining element 32 and the rib 60 of the reduction gear 19 respectively have a circular section, this section being considered perpendicular to the axis of rotation X.

Preferably, the retaining element 32 is configured to be inserted inside the casing 17, until the bearing of the second stop 45 of the retaining element 32 with the casing 17, with a tight fit, so as to participate in the sealing between the retaining element 32 and the casing 17.

Preferably, the retaining element 32 comprises a passage opening 62 for the output shaft 20.

Thus, the output shaft 20 is configured to extend on either side of the retaining element 32 by passing through the opening 62.

Here, the opening 62 of the retaining element 32 is centered relative to the axis of rotation X of the electromechanical actuator 11.

Advantageously, the output shaft 20 comprises fastening elements 63a configured to cooperate with fastening elements 63b of the reduction gear 19 and, more specifically, of the endpiece 34 of the reduction gear 19.

Thus, the output shaft 20 and the reduction gear 19 are also assembled to one another using fastening elements 63a, 63b.

In this way, the assembly of the output shaft 20 with the reduction gear 19 makes it possible to block the translation of the output shaft 20 relative to the reduction gear 19 and the retaining element 32.

Preferably, the fastening elements 63a, 63b of the output shaft 20 and the reduction gear 19 are fastening elements by resilient snapping.

Thus, the assembly of the output shaft 20 with the retaining element 32 is carried out simply and inexpensively.

Advantageously, the retaining element 32 comprises protrusions 39, each in the form of a radial protrusion, configured to cooperate with first recesses 40 of the casing 17, as illustrated in FIG. 7. The first recesses 40 are arranged at the first end 17a of the casing 17.

Thus, the retaining element 32 is blocked in rotation relative to the casing 17 using protrusions 39 of the retaining element 32 and recesses 40 of the casing 17.

Here, the retaining element 32 comprises two diametrically opposite protrusions 39 relative to the axis of rotation X. Furthermore, the casing 17 comprises two first recesses 40 that are diametrically opposite relative to the axis of rotation X.

In this way, such an assembly of the endpiece 34, the retaining element 32 and the casing 17 makes it possible to block the rotation of the assembly 27 relative to the casing 17 and, more specifically, the reduction gear 19 relative to the casing 17.

Furthermore, the cooperation of the protrusions 39 of the retaining element 32 with the first recesses 40 of the casing 17 makes it possible to perform a reaction of torque transmitted by the reduction gear 19 to the casing 17.

Advantageously, the retaining element 32 comprises fastening elements 52a configured to cooperate with fastening elements 52b of the casing 17.

Thus, the retaining element 32 and the casing 17 are also assembled to one another using fastening elements 52a, 52b.

In this way, the assembly of the retaining element 32 with the casing 17 makes it possible to block the translation of the retaining element 32 and, more specifically, the assembly 27 relative to the casing 17 and, more specifically, relative to the first end 17a of the casing 17.

Furthermore, following the fastening of the retaining element 32 with respect to the casing 17, the retaining element 32 serves as a stop for the assembly 27, during the sliding of the assembly 27 inside the casing 17, along the axial direction of the electromechanical actuator 11 and from the second end 17b of the casing 17 toward the first end 17a of the casing 17.

Preferably, the fastening elements 52a, 52b of the retaining element 32 and the casing 17 are fastening elements by resilient snapping.

Thus, the assembly of the retaining element 32 with the casing 17 is carried out simply and inexpensively.

Figure 12:
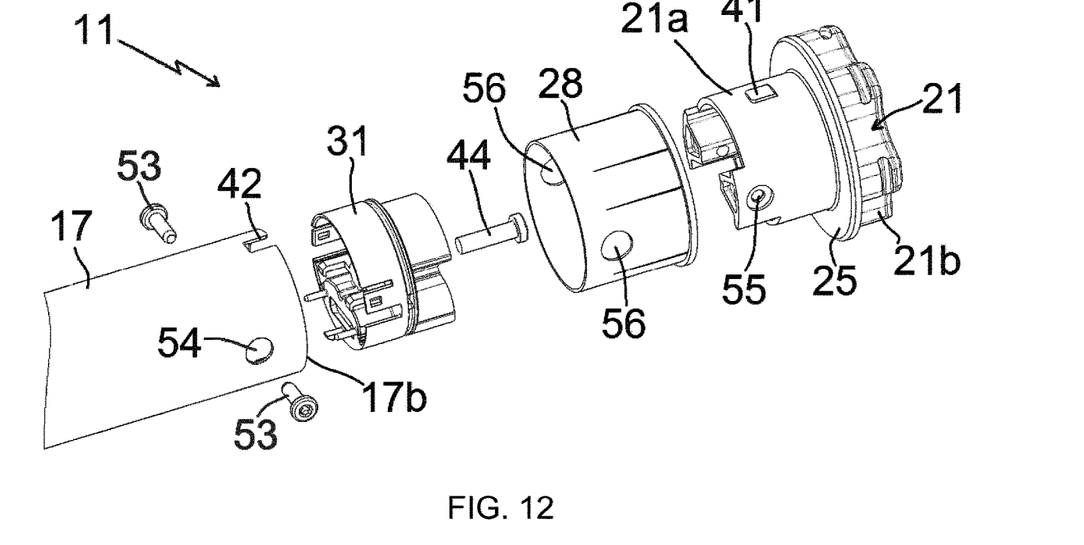
FIG. 12 is an exploded and perspective schematic view of part of the electromechanical actuator illustrated in FIGS. 4 and 5, showing part of the casing of the electrochemical actuator, a crown, the closure element, the interface element and the inhibiting element.

We now describe, in more detail and in reference to FIG. 12, the assembly of the part of the electromechanical actuator 11 on the side of the closure element 21.

Advantageously, the closure element 21 and, more specifically, the first part 21a of the closure element 21 comprises indentations 41, each in the form of a radial protrusion, configured to cooperate with second recesses 42 of the casing 17. The second recesses 42 are arranged at the second end 17b of the casing 17.

Here, the first part 21a of the closure element 21 comprises two diametrically opposite indentations 41 relative to the axis of rotation X. Furthermore, the casing 17 comprises two second recesses 42 that are diametrically opposite relative to the axis of rotation X.

In this way, such an assembly of the closure element 21 and the casing 17 makes it possible to block the rotation of the closure element 21 relative to the casing 17.

Furthermore, the closure element 21 and the casing 17 are also assembled to one another using fastening elements 53, in particular by screwing.

In this way, the assembly of the closure element 21 with the casing 17 makes it possible to block the translation of the closure element 21 relative to the casing 17 and, more specifically, relative to the second end 17b of the casing 17.

Here, the fastening of the closure element 21 with the casing 17 is carried out using fastening screws 53, which may, for example, be of the self-tapping type. In the assembled configuration of the electromechanical actuator 11, the fastening screws 53 pass through passage holes 54 arranged in the casing 17 and are screwed in fastening holes 55 of the closure element 21. Furthermore, the fastening screws 53 pass through passage holes 56 arranged in the crown 28.

In a variant, not shown, the fastening elements of the closure element 21 with the casing 17 can be rivets or fastening elements by resilient snapping.

Such an assembly of the electromechanical actuator 11 makes it possible to provide play J, in particular axial, between the closure element 21 and the interface element 31, along the axial direction of the electromechanical actuator 11, as illustrated in FIG. 5.

The play J makes it possible to guarantee the assembly of the closure element 21 relative to the casing 17.

Here and non-limitingly, the play J between the closure element 21 and the interface element 31, along the axial direction of the electromechanical actuator 11, can be of the order of plus or minus two millimeters.

Advantageously, the interface element 31 comprises a first accommodation 43 inside which an inhibiting element 44 is positioned inhibiting the play J between the closure element 21 and the interface element 31, along the axial direction of the electromechanical actuator 11.

Thus, the inhibiting element 44 of the play J between the closure element 21 and the interface element 31, along the axial direction of the electromechanical actuator 11, makes it possible to improve the holding of the members 31, 15, 16, 19, 24, 20 of the electromechanical actuator 11 that are positioned inside the casing 17 and to eliminate the risk of electrical disconnection of the electronic control unit 15 with respect to the electrical power cable 18 and with respect to the electric motor 16, in particular upon impact of the electromechanical actuator 11, which may occur during a manipulation or the transport of the electromechanical actuator 11, or during abnormal operation of the electromechanical actuator 11.

In this way, such a construction of the electromechanical actuator 11 makes it possible to inhibit the play J between the closure element 21 and the interface element 31, along the axial direction of the electromechanical actuator 11, following the assembly of the electromechanical actuator 11, so as to guarantee a functional state of the electromechanical actuator 11, during different phases in the lifetime of the electromechanical actuator 11.

Furthermore, the inhibiting element 44 makes it possible to block the translation of the interface element 31 relative to the closure element 21.

Here, the first accommodation 43 of the interface element 31 has a generally cylindrical shape, centered on a longitudinal axis X31 of the interface element 31.

Furthermore, the longitudinal axis X31 of the interface element 31 is combined with the rotation axis X of the electric motor 16 of the electromechanical actuator 11, or the rotation axis of the winding tube 4, in the mounted configuration of the motorized driving device 5.

Preferably, the closure element 21 comprises a first accommodation 26 emerging at a first face 21c of the closure element 21 and at a second face 21d of the closure element 21.

The first accommodation 26 of the closure element 21 is positioned opposite the inhibiting element 44, in the assembled configuration of the electromechanical actuator 11, so as to allow a position adjustment of the inhibiting element 44 from the outside of the closure element 21.

Thus, the position adjustment of the inhibiting element 44 with respect to the interface element 31 and the closure element 21, along the axial direction of the electromechanical actuator 11, can be carried out from the outside of the closure element 21 and, more specifically, of the electromechanical actuator 11, by maneuvering the inhibiting element 44 using a tool, not shown, such as a screwdriver, that passes through the first accommodation 26 of the closure element 21, as explained hereinafter.

In this way, the positioning of the inhibiting element 44 relative to the interface element 31 and the closure element 21, along the axial direction of the electromechanical actuator 11, can be carried out as a function of the value of the play J, without having to disassemble one or several elements of the electromechanical actuator 11.

Here, the first accommodation 26 of the closure element 21 has a generally cylindrical shape, centered on a longitudinal axis X21 of the closure element 21.

Furthermore, the longitudinal axis X21 of the closure element 21 is combined with the rotation axis X of the electric motor 16 of the electromechanical actuator 11, or the rotation axis of the winding tube 4, in the mounted configuration of the motorized driving device 5. Furthermore, the longitudinal axis X21 of the closure element 21 is combined with the longitudinal axis X31 of the interface element 31, in the assembled configuration of the electromechanical actuator 11.

Advantageously, the inhibiting element 44 is configured to cooperate with a face of the closure element 21 and, more specifically, the second face 21d of the closure element 21, following a position adjustment of the inhibiting element 44 relative to the closure element 21, along the axial direction of the electromechanical actuator 11, so as to inhibit the play J between the closure element 21 and the interface element 31.

Thus, the inhibition of the play J between the closure element 21 and the interface element 31 is implemented by the position adjustment of the inhibiting element 44 relative to the interface element 31 and the closure element 21, along the axial direction of the electromechanical actuator 11 and, more specifically, the bearing of the inhibiting element 44 against the second face 21d of the closure element 21.

Preferably, the inhibiting element 44 is a screw. Furthermore, the first accommodation 43 of the interface element 31 is a bore.

Here, the inhibiting element 44 is a screw having a metric thread. Furthermore, the first accommodation 43 of the interface element 31 is a tapped bore.

In a variant, not shown, the inhibiting element 44 is a self-tapping screw. In this case, the first accommodation 43 of the interface element 31 is a smooth bore.

In one exemplary embodiment, the screw forming the inhibiting element 44 is a screw identical to the screws forming the fastening elements 53 of the closure element 21 with the casing 17.

Thus, the number of screw models for manufacturing the electromechanical actuator 11 is limited, so as to simplify industrialization and avoid reference error risks.

In practice, a head of the screw forming the inhibiting element 44 is configured to cooperate with the second face 21d of the closure element 21, following of the unscrewing of the screw 44 relative to the bore 43 of the interface element 31, so as to inhibit the play J between the closure element 21 and the interface element 31.

Advantageously, the first accommodation 26 arranged in the closure element 21 allows the passage of a tool, in particular a screwdriver, so as to reach the inhibiting element 44 and, more specifically, to allow the unscrewing of the screw forming the inhibiting element 44.

Preferably, the inhibiting element 44 is assembled on the interface element 31 before the assembly 27 is introduced inside the casing 17.

Thus, the operation to assemble the inhibiting element 44 on the interface element 31 does not cause an extension of the time to assemble the assembly 27 inside the casing 17, since this operation can be carried out during hidden time, during the manufacturing of the electromechanical actuator 11.

Here, the screw 44 is screwed to the inside of the first accommodation 43 of the interface element 31 before the assembly 27 is introduced inside the casing 17, in particular until the head of the screw 44 is made to bear against the rim of the first accommodation 43 of the interface element 31.

Advantageously, the closure element 21 comprises a second accommodation 46. The second accommodation 46 of the closure element 21 is configured to allow the passage of the electrical power cable 18.

Furthermore, the interface element 31 comprises a second accommodation 47. The second accommodation 47 of the interface element 31 comprises part of the first electrical connector 48. The first electrical connector 48 arranged in the second accommodation 47 of the interface element 31 is configured to cooperate with an electrical connector of the electrical power cable 18.

Furthermore, the first electrical connector 48 of the interface element 31 is electrically coupled to the electronic control unit 15, using electrical connection elements, in particular using electrical pins, not shown, configured to cooperate with tracks of the electronic board 29 of the electronic control unit 15.

Thus, the electrical connector of the electrical power cable 18 is configured to cooperate with the first electrical connector 48 of the interface element 31, so as to supply electrical energy to the electric motor 16, using the electrical power cable 18.

In one exemplary embodiment, not shown, the second accommodation 46 of the closure element 21 is also configured to allow the passage of a data exchange cable.

In this case, the interface element 31 comprises a third accommodation. The third accommodation of the interface element 31 comprises a second electrical connector. The second electrical connector arranged in the third accommodation of the interface element 31 is configured to cooperate with an electrical connector of the data exchange cable.

Furthermore, still in this case, the second electrical connector of the interface element 31 is electrically coupled to the electronic control unit 15, using electrical connection elements, in particular using electrical pins, not shown, configured to cooperate with tracks of the electronic board 29 of the electronic control unit 15.

In such a case where the electromechanical actuator 11 is coupled to the data exchange cable, the latter allows the electronic control unit 15 to receive and/or send data with a control unit, in particular with the local control unit 12 and/or the central control unit 13, via a wired link.

Thus, the electrical connector of the data exchange cable is configured to cooperate with the second electrical connector of the interface element 31, so as to exchange data between at least one of the control units 12, 13 and the electronic control unit 15.

Owing to the present invention, the sealing of the electromechanical actuator, at the first end of the casing, is carried out, on the one hand, by the partial fitting of the retaining element inside the casing, so as to close off the first end of the casing and, on the other hand, by the formation of a baffle between the retaining element and the reduction gear, using the accommodation of the retaining element and the rib of the reduction gear.

In this way, the assembly of the retaining element with the casing and the reduction gear, at the first end of the casing, makes it possible to guarantee the sealing of the electromechanical actuator reliably, while minimizing the costs of obtaining the electromechanical actuator.

Many changes can be made to the example embodiment previously described without going beyond the scope of the invention.

In a variant, not shown, the housing 30 of the electronic control unit 15 comprises a number of sections, made in the form of a hollow tube, greater than or equal to three.

In a variant, not shown, the electronic control unit 15 is positioned outside the casing 17 of the electromechanical actuator 11 and, in particular, mounted on the support 23 or in the closure element 21.

Furthermore, the considered embodiments and variants may be combined to generate new embodiments of the invention, without going beyond the scope of the invention.

The invention claimed is:

1. A tubular electromechanical actuator for a closure or sun protection home automation installation, the electromechanical actuator comprising at least:
   an electric motor;
   a reduction gear;
   an output shaft configured to be coupled to a winding tube for driving the winding tube in rotation, so as to unwind or wind a screen of the closure or sun protection home automation installation;
   a hollow casing configured to be fastened to a support of the closure or sun protection home automation installation and to house at least the electric motor and the reduction gear, the casing comprising a first end and a second end, the second end being opposite the first end; and
   a retaining element, the retaining element being, in an assembled configuration of the electromechanical actuator, located at and fastened to the first end of the casing to close off the first end of the casing,
   wherein:
   the retaining element comprises at least:
     a first stop configured to cooperate with the reduction gear, in the assembled configuration of the electromechanical actuator, and
     a second stop configured to cooperate with the casing, at the first end of the casing, in the assembled configuration of the electromechanical actuator; and
   the reduction gear comprises at least one rib, and the retaining element comprises at least one accommodation configured to receive the at least one rib of the reduction gear in a manner that forms a sealing between the retaining element and the reduction gear.

2. The tubular electromechanical actuator for a closure or sun protection home automation installation according to claim 1,
   wherein the reduction gear comprises an endpiece configured to cooperate with the retaining element, at the first end of the casing, in the assembled configuration of the electromechanical actuator, and
   wherein the rib is a rib of the endpiece.

3. The tubular electromechanical actuator for a closure or sun protection home automation installation according to claim 2, wherein the endpiece comprises notches and tongues, positioned alternating around an axis of rotation of the electromechanical actuator, configured to cooperate, respectively, with tongues and notches of the retaining element.

4. The tubular electromechanical actuator for a closure or sun protection home automation installation according to claim 3, wherein the retaining element comprises protrusions configured to cooperate with first recesses of the casing, the first recesses being arranged at the first end of the casing.

5. The tubular electromechanical actuator for a closure or sun protection home automation installation according to claim 3, wherein the retaining element comprises a passage opening for the output shaft.

6. The tubular electromechanical actuator for a closure or sun protection home automation installation according to claim 3, wherein the retaining element comprises fastening elements configured to cooperate with fastening elements of the casing.

7. The tubular electromechanical actuator for a closure or sun protection home automation installation according to claim 2, wherein the retaining element comprises protrusions configured to cooperate with first recesses of the casing, the first recesses being arranged at the first end of the casing.

8. The tubular electromechanical actuator for a closure or sun protection home automation installation according to claim 2, wherein the retaining element comprises a passage opening for the output shaft.

9. The tubular electromechanical actuator for a closure or sun protection home automation installation according to claim 2, wherein the retaining element comprises fastening elements configured to cooperate with fastening elements of the casing.

10. The tubular electromechanical actuator for a closure or sun protection home automation installation according to claim 2, wherein the output shaft is configured to protrude past the casing at the first end of the casing, in the assembled configuration of the electromechanical actuator.

11. The tubular electromechanical actuator for a closure or sun protection home automation installation according to claim 1, wherein the retaining element comprises protrusions configured to cooperate with first recesses of the casing, the first recesses being arranged at the first end of the casing.

12. The tubular electromechanical actuator for a closure or sun protection home automation installation according to claim 4, wherein the retaining element comprises a passage opening for the output shaft.

13. The tubular electromechanical actuator for a closure or sun protection home automation installation according to claim 11, wherein the retaining element comprises fastening elements configured to cooperate with fastening elements of the casing.

14. The tubular electromechanical actuator for a closure or sun protection home automation installation according to claim 1, wherein the retaining element comprises a passage opening for the output shaft.

15. The tubular electromechanical actuator for a closure or sun protection home automation installation according to claim 14, wherein the retaining element comprises fastening elements configured to cooperate with fastening elements of the casing.

16. The tubular electromechanical actuator for a closure or sun protection home automation installation according to claim 1, wherein the retaining element comprises fastening elements configured to cooperate with fastening elements of the casing.

17. The tubular electromechanical actuator for a closure or sun protection home automation installation according to claim 16, wherein the fastening elements of the retaining element and the fastening elements of the casing are configured to resiliently fasten with each other by resilient snapping.

18. The tubular electromechanical actuator for a closure or sun protection home automation installation according to claim 1, wherein the output shaft is configured to protrude past the casing at the first end of the casing, in the assembled configuration of the electromechanical actuator.

19. The tubular electromechanical actuator for a closure or sun protection home automation installation according to claim 1, wherein the retaining element is configured to be inserted inside the casing until the second stop of the retaining element bears against the casing and forms a sealing between the retaining element and the casing.

20. A home automation installation for providing closure or sun protection, comprising:
   a winding tube;
   a tubular electromechanical actuator; and
   a screen configured to be wound on the winding tube, the winding tube configured to be rotated by the tubular electromechanical actuator,
   wherein the tubular electromechanical actuator comprises at least:
      an electric motor;
      a reduction gear;
      an output shaft configured to be coupled to the winding tube for driving the winding tube in rotation, so as to unwind or wind the screen;
      a hollow casing configured to be fastened to a support of the closure or sun protection home automation installation and to house at least the electric motor and the reduction gear, the casing comprising a first end and a second end, the second end being opposite the first end; and
   a retaining element, the retaining element being, in an assembled configuration of the electromechanical actuator, located at and fastened to the first end of the casing to close off the first end of the casing,
   wherein:
   the retaining element comprises at least:
      a first stop configured to cooperate with the reduction gear, in the assembled configuration of the electromechanical actuator, and
      a second stop configured to cooperate with the casing, at the first end of the casing, in the assembled configuration of the electromechanical actuator, and
   the reduction gear comprises at least one rib, and the retaining element comprises at least one accommodation configured to receive the at least one rib of the reduction gear in a manner that forms a sealing between the retaining element and the reduction gear.

21. The home automation installation according to claim 20, wherein sealing of the electromechanical actuator, at the first end of the casing, is carried out by partial fitting of the retaining element inside the casing so as to close off the first end of the casing, and by formation of a baffle between the retaining element and the reduction gear using the accommodation of the retaining element and the rib of the reduction gear.

22. The tubular electromechanical actuator for a closure or sun protection home automation installation according to claim 1, wherein sealing of the electromechanical actuator, at the first end of the casing, is carried out by partial fitting of the retaining element inside the casing so as to close off the first end of the casing, and by formation of a baffle between the retaining element and the reduction gear using the accommodation of the retaining element and the rib of the reduction gear.

* * * * *